(12) United States Patent  
Krasnov et al.

(10) Patent No.: US 10,928,330 B2  
(45) Date of Patent: Feb. 23, 2021

(54) METHOD AND SYSTEM FOR DETECTING INCLUSIONS IN FLOAT GLASS BASED ON WAVELENGTH(S) ANALYSIS

(71) Applicant: GUARDIAN GLASS, LLC, Auburn Hills, MI (US)

(72) Inventors: Alexey Krasnov, Canton, MI (US); Xuequn Hu, Northville, MI (US)

(73) Assignee: Guardian Glass, LLC, Auburn Hills, MI (US)

( * ) Notice: Subject to any disclaimer, the term of this patent is extended or adjusted under 35 U.S.C. 154(b) by 0 days.

(21) Appl. No.: 16/295,141

(22) Filed: Mar. 7, 2019

(65) Prior Publication Data  
US 2019/0277773 A1     Sep. 12, 2019

Related U.S. Application Data

(60) Provisional application No. 62/639,547, filed on Mar. 7, 2018.

(51) Int. Cl.  
*G01N 21/896* (2006.01)  
*C03C 3/078* (2006.01)  
(Continued)

(52) U.S. Cl.  
CPC ........... *G01N 21/896* (2013.01); *C03C 3/078* (2013.01); *C03C 23/0015* (2013.01);  
(Continued)

(58) Field of Classification Search  
CPC ............. G01B 9/0209; G01B 11/2441; G01B 2290/45; G01B 2290/70; G01B 9/02007; G01B 9/02027; G01B 9/02057; G01B 9/0201; G01B 9/02039; G01B 9/02068; G01B 9/02077; G01B 11/0633; G01B 11/0675; G01B 11/026; G01B 11/06; G01B 11/0625; G01B 11/0691; G01B 11/306;  
(Continued)

(56) References Cited

U.S. PATENT DOCUMENTS 3,083,551 A   4/1963  Pilkington  
3,220,816 A   11/1965 Pilkington  
(Continued)

FOREIGN PATENT DOCUMENTS

DE    202014004779 U1   7/2014  
DE    10 2013 002 602 A1   8/2014  
(Continued)

OTHER PUBLICATIONS

U.S. Appl. No. 15/615,903, filed Jun. 7, 2017; Krasnov et al.  
(Continued)

*Primary Examiner* — Michael P Stafira

(57) ABSTRACT

A method and/or system is provided for detecting inclusions (e.g., nickel sulfide based inclusions/defects) in soda-lime-silica based glass, such as float glass. In certain example instances, during and/or after the glass-making process, following the stage in the float process where the glass sheet is formed and floated on a molten material (e.g., tin bath) and cooled or allowed to cool such as via an annealing lehr, light is directed at the resulting glass and reflection of various wavelengths (e.g., red and blue wavelengths) is analyzed to detect inclusions.

30 Claims, 4 Drawing Sheets

(51) Int. Cl.
  *C03C 23/00* (2006.01)
  *G01N 21/25* (2006.01)
  *C03C 3/087* (2006.01)
  *G01N 21/88* (2006.01)
(52) U.S. Cl.
  CPC .......... *G01N 21/25* (2013.01); *C03C 3/087* (2013.01); *G01N 2021/8845* (2013.01)
(58) Field of Classification Search
  CPC .... G01B 21/06; G01B 21/08; G01B 9/02043; G01B 9/02067; G01B 9/02076; G01B 9/02084; G01B 9/02088; G01B 11/16; G01B 11/18; G01B 5/1861; G01B 11/168; G01B 11/30; G01B 11/303; G01B 11/24; G01B 11/26; G01N 21/958; G01N 21/8422; G01N 21/9501; G01N 2021/8825; G01N 2021/9513; G01N 21/27; G01N 21/9054; G01N 2021/6463; G01N 2021/6484; G01N 2021/845; G01N 2021/8822; G01N 2021/8829; G01N 2021/8854; G01N 21/8861; G01N 2021/8864; G01N 2021/8867; G01N 2021/887; G01N 2021/9583; G01N 2021/9586; G01N 21/0303; G01N 21/255; G01N 21/45; G01N 21/61; G01N 21/645; G01N 21/8803; G01N 21/8806; G01N 21/896; G01N 21/90; G01N 21/9036; G01N 21/9072; G01N 21/94; G01N 21/952; G01N 21/954; G01N 21/956; G01N 21/95607; G01N 2201/08; G01N 27/44721; G01N 17/002; G01N 2021/8967; G01N 21/31; G01N 33/287; G01N 2021/8416; G01N 2021/8438; G01N 2021/8845; G01N 2021/8848; G01N 21/25; G01N 21/552; G01N 21/59; G01N 21/88; G01N 21/8901; G01N 21/8903; G01N 21/8914; G01N 2201/126; G01N 25/72; G01N 33/386; G01N 2021/95638; G01N 2021/8427; G01N 25/18; G01N 1/28; G01N 2021/157; G01N 2021/177; G01N 2021/216; G01N 2021/4735; G01N 2021/8411; G01N 2021/8832; G01N 2021/8861; G01N 21/15; G01N 21/21; G01N 21/23; G01N 21/274; G01N 21/55; G01N 21/86; G01N 21/8851; G01N 21/9009; G01N 21/93; G01N 2201/065; G01N 2201/0683; G01N 33/54326; G01N 35/04; G01N 21/8416; C03C 17/32; C03C 17/28; C03C 17/326; C03C 17/42; C03C 2217/70; C03C 2218/32; C03C 23/0075; C03C 21/002; C03C 17/005; C03C 17/30; C03C 2217/78; C03C 2218/111; C03C 3/097; C03C 10/0027; C03C 10/0054; C03C 2204/00; C03C 3/093; C03C 4/02; C03C 10/00; C03C 10/0009; C03C 10/0018; C03C 17/001; C03C 17/002; C03C 17/008; C03C 17/22; C03C 17/25; C03C 17/27; C03C 19/00; C03C 1/00; C03C 21/00; C03C 2204/04; C03C 2217/76; C03C 2218/112; C03C 2218/31; C03C 23/007; C03C 27/10; C03C 3/04; C03C 3/085; C03C 3/091; C03C 3/112; C03C 3/155; C03C 3/247; C03C 3/321; C03C 4/005; G02B 21/04; G02B 21/368; G02B 27/00; G02B 5/223; G02B 5/287; G02B 2027/0138; G02B 2027/014; G02B 2027/0141; G02B 23/2415; G02B 23/2484; G02B 27/017; G02B 13/06; G02B 17/08; G02B 2027/0178; G02B 2027/0187; G02B 21/0012; G02B 21/084; G02B 21/125; G02B 21/20; G02B 21/34; G02B 21/361; G02B 21/362; G02B 21/365; G02B 21/367; G02B 23/2423; G02B 26/0816; G02B 26/10; G02B 26/101; G02B 27/01; G02B 27/0172; G02B 27/022; G02B 27/026; G02B 27/283; G02B 5/18; G02B 5/1861; G01J 2005/0029; G01J 2005/0077; G01J 5/0022; G01J 5/0066; G01J 5/04; G01J 5/0812; G01J 5/0825; G01J 5/0831; G01J 5/0896; G01J 5/20; G01J 3/42; G01J 3/46; G01J 3/50
  See application file for complete search history.

(56) References Cited

U.S. PATENT DOCUMENTS

| | | | |
|---|---|---|---|
| 3,954,432 A | 5/1976 | Hummel et al. | |
| 4,697,082 A * | 9/1987 | Bartelsen | G01N 21/896 250/341.1 |
| 5,214,008 A | 5/1993 | Beckwith et al. | |
| 7,369,240 B1 * | 5/2008 | Abbott | G01N 21/896 356/429 |
| 7,511,807 B2 | 3/2009 | Fang et al. | |
| 7,743,630 B2 | 6/2010 | Krasnov et al. | |
| 8,677,782 B2 | 3/2014 | Disteldorf et al. | |
| 9,016,094 B2 | 4/2015 | Siess et al. | |
| 10,481,097 B1 * | 11/2019 | Agbuga | G01N 21/658 |
| 2003/0053066 A1 * | 3/2003 | Redner | G01N 21/57 356/448 |
| 2004/0207839 A1 | 10/2004 | Gerstner et al. | |
| 2006/0066846 A1 * | 3/2006 | Chen | G01N 21/8851 356/239.1 |
| 2008/0060383 A1 * | 3/2008 | Schuller | G01N 25/72 65/29.18 |
| 2009/0185179 A1 * | 7/2009 | Hill | G01N 21/958 356/239.1 |
| 2010/0051834 A1 * | 3/2010 | Lopatin | G01N 21/896 250/553 |
| 2019/0145904 A1 * | 5/2019 | Lopez | G01N 21/90 356/239.4 |
| 2019/0277773 A1 * | 9/2019 | Krasnov | C03C 3/078 |
| 2019/0376909 A1 * | 12/2019 | Hegstrom | G01B 11/16 |

FOREIGN PATENT DOCUMENTS

| | | | |
|---|---|---|---|
| WO | 0118532 A1 | 3/2001 | |
| WO | WO-0118532 A1 * | 3/2001 | .......... G01N 21/896 |
| WO | 2015162303 A1 | 10/2015 | |

OTHER PUBLICATIONS

U.S. Appl. No. 16/295,099, filed Mar. 7, 2019; Krasnov et al.
Schittich et al., :Glass Construction Manual $2^{nd}$ Revised and Expanded Edition 2007, Munich, Germany.
Musgraves et al., "Springer Handbook of Glass" published by Springer Nature Switzerland AG.
International Search Report and Written Opinion dated Jul. 23, 2019, for International Application No. PCT/IB2019/051852, 9 pages.

* cited by examiner

Fig. 1 Absorption spectrum of NiS inclusions

Fig. 2    Transmission spectrum of regular float glass.

METHOD AND SYSTEM FOR DETECTING INCLUSIONS IN FLOAT GLASS BASED ON WAVELENGTH(S) ANALYSIS

CROSS REFERENCE TO RELATED CASES

This application claims priority on U.S. Application No. 62/639,547, filed Mar. 7, 2018, the disclosure of which is hereby incorporated herein by reference in its entirety.

FIELD

Example embodiments of this invention relate to a method and/or system for detecting inclusions and/or other defects (e.g., micro inclusions such as nickel sulfide based inclusions/defects) in soda-lime-silica based glass, such as float glass. In certain example embodiments of this invention, light (e.g., visible light) from at least one light source is directed at the glass, and different wavelengths of reflected light (e.g., refracted and/or scattered light) from the at least one light source are analyzed and compared and inclusions can be detected based on differentiating between the different wavelengths. For example, nickel sulfide inclusions have surface roughness features that will affect a given wavelength range (e.g., 400-500 nm) differently than another wavelength range(s) (e.g., 600-650 nm). For example, nickel sulfide inclusions have surface roughness features that will diffract more blue light than red light, thereby providing different degrees of scattering at different wavelengths. Thus, nickel sulfide based inclusions may be detected based on different wavelengths being affected (e.g., diffracted and/or scattered) differently, whereas float glass itself absent inclusions or having inclusions with smooth mirror-like surfaces does not have such an effect. In an example embodiment of this invention, during and/or after the glass-making process, following the stage in the float process where the glass sheet is formed and floated on a molten material (e.g., tin bath) and cooled or allowed to at least partially cool such as after an annealing lehr, light from at least one light source(s) is directed at the resulting glass and inclusions may be detected based on analyzing and/or comparing reflected light (e.g., refracted and/or scattered light) as a function of wavelength ($\lambda$). For example, significant differences in reflected light (e.g., refracted and/or scattered) at a given location may indicate the presence of a nickel sulfide based inclusion.

BACKGROUND OF THE INVENTION

The process of making float glass is known in the art. For example, see U.S. Pat. Nos. 3,954,432, 3,083,551, 3,220,816, 7,743,630, 8,677,782, 9,016,094, and 5,214,008, the disclosures of all of which are hereby incorporated herein in their entireties by reference. Generally speaking, in a float glass-making line, batch materials are heated in a furnace or melter to form a glass melt. The glass melt is poured onto a bath of molten material such as tin (tin bath) and is then continuously cooled to form a float glass ribbon. The float glass ribbon is then forwarded to an annealing lehr for further processing and then may be cut to form solid glass articles, such as flat glass sheets. For float glass, the glass batch often includes soda, lime and silica to form soda-lime-silica based flat glass.

Float glass is widely used for windows in commercial and residential buildings, glass furniture, shower doors, and automotive windshields. For many products, float glass must be thermally tempered (undergo heating to at least 580 degrees C., followed by a rapid cooling) to ensure safety in case of breakage. Impurities from raw materials, sulfur from additive(s), and/or contaminations from the float process occasionally and unpredictably form unwanted chemical compounds (e.g., inclusions) during glass formation, which are undesirable defects in the glass. Nickel, for example, is known to spontaneously bond with sulfur to form inclusions of or based on nickel sulfide (of any suitable stoichiometry such as NiS).

Although typically harmless in annealed glass (e.g., made via the float process without any additional heat treatment such as thermal tempering), NiS inclusions are known for causing spontaneous breakage of thermally tempered glass. Moreover, NiS inclusions/defects in thermally tempered glass have caused catastrophic glass failure over long periods of time in installed products. Rejecting defective annealed glass, therefore, serves at least two purposes: a) increase production yield during the expensive thermal tempering and heat soaking stages, and b) minimize catastrophic failures of glass in installed products.

Nickel sulfide exists in different phases at different temperatures. For instance, two specific phases of NiS known are the alpha-phase and the beta-phase. At temperatures below 715 degrees F. (379 C), nickel sulfide is relatively stable in the beta-phase form. Above this temperature, it is stable in the alpha-phase. Therefore, when glass is produced in a furnace, it is likely that any NiS inclusions will be in the alpha-phase. In typical annealed glass, the slow cooling process provided by the annealing lehr allows the NiS ample time to transform to its beta-phase as the glass cools. However, in the fast cooling process used in both heat-strengthened and tempered glass, there is often insufficient time to complete the phase transition (which is a relatively slow process). The NiS inclusions are therefore trapped in the glass in their high-temperature alpha-phase. However, once the glass cools past the phase change temperature, the NiS inclusion seeks to reenter the lower energy beta-phase. For trapped inclusions, this process takes anywhere from months to years. This may have no effect on glass, were it not for the point that when the NiS changes from alpha-phase to beta-phase, it increases in volume such as by 2-4%. This expansion may create localized tensile stresses which can lead to glass failures.

Nickel sulfide is a compound that comes in various forms as well. The most common forms of nickel sulfide are $Ni_7S_6$, NiS, $NiS_{1.03}$, $Ni_3S_2$ and $Ni_3S_2$+Ni. When viewed under an electron microscope, $Ni_7S_6$, NiS, and $NiS_{1.03}$ are yellow-gold in color and have a rugged surface similar to a golf ball. These three types are non-magnetic and have been found to cause failure in tempered glass.

Various methods have been used for inline detection of NiS inclusions and other micro-defects of similar size scale (e.g., 40-150 microns sized defects). U.S. Pat. No. 7,511,807, incorporated herein by reference, for example directs light at the glass and looks for light scattering in order to detect inclusions. Conventional techniques for detecting inclusions therefore have been inefficient and sometimes ineffective.

In view of the above, it will be apparent that there exists a need in the art for an improved method of making glass, and controlling glass quality, including an improved method and/or apparatus for detecting inclusions in soda-lime-silica based glass.

SUMMARY OF EXAMPLE EMBODIMENTS OF THE INVENTION

A method and/or system is provided for detecting inclusions (e.g., nickel sulfide based inclusions/defects) in sodalime-silica based glass. Inline systems and/or methods discussed herein may be used to detect, for example, inclusions and/or other defects in float glass, such as nickel sulfide inclusions and/or other micro-defects having a size of from about 30-200 μm, more preferably from about 40-150 μm, and/or may be used to differentiate such nickel sulfide based inclusions from other inclusions.

In certain example embodiments, the soda-lime-silica based glass comprises a base glass portion that includes, by weight percentage: $SiO_2$ 67-75%, $Na_2O$ 10-20%, CaO 5-15%, $Al_2O_3$ 0-7%, MgO 0-7%, and $K_2O$ 0-7%. Optionally, a colorant portion of the glass may further include one or more colorants such as iron, selenium, cobalt, erbium and/or the like.

In certain example embodiments of this invention, there is provided a method and/or system for detecting inclusions and/or other defects (e.g., micro inclusions such as nickel sulfide based inclusions/defects) in soda-lime-silica based glass, such as float glass. In certain example embodiments of this invention, light (e.g., visible light) from at least one light source is directed at the glass, and different wavelengths of reflected light (e.g., refracted and/or scattered light) from the at least one light source are analyzed and compared and inclusions can be detected based on differentiating between the different wavelengths. For example, nickel sulfide inclusions have surface roughness features that will affect a given wavelength range (e.g., 400-500 nm) differently than another wavelength range(s) (e.g., 600-650 nm). For example, nickel sulfide inclusions have surface roughness features that will diffract more blue light than red light, thereby providing different degrees of scattering at different wavelengths. Thus, nickel sulfide based inclusions may be detected based on different wavelengths being affected (e.g., diffracted and/or scattered) differently, whereas float glass itself absent inclusions or having inclusions with smooth mirror-like surfaces does not have such an effect. In an example embodiment of this invention, during and/or after the glass-making process, following the stage in the float process where the glass sheet is formed and floated on a molten material (e.g., tin bath) and cooled or allowed to at least partially cool such as after an annealing lehr, light from at least one light source(s) is directed at the resulting glass and inclusions may be detected based on analyzing and/or comparing reflected light (e.g., refracted and/or scattered light) as a function of wavelength (λ). For example, significant differences in reflected light (e.g., refracted and/or scattered) at a given location may indicate the presence of a nickel sulfide based inclusion.

In an example embodiment of this invention, there is provided a system for detecting an inclusion in glass, the glass including a base glass composition comprising: $SiO_2$ 67-75%, $Na_2O$ 10-20%, CaO 5-15%, $Al_2O_3$ 0-7%, $K_2O$ 0-7%, the system comprising: at least one light source for directing light toward the glass; and a processor configured to determine whether an inclusion comprising nickel sulfide is present in the glass based at least on a difference between first and second reflected wavelengths.

In an example embodiment of this invention, there is provided a system for detecting an inclusion in glass, the glass including a base glass composition comprising: $SiO_2$ 67-75%, $Na_2O$ 10-20%, CaO 5-15%, $Al_2O_3$ 0-7%, $K_2O$ 0-7%, the system comprising: at least one light source for directing light toward the glass; and a processor configured to determine whether an inclusion comprising nickel sulfide is present in the glass based at least reflectance of first and second reflected wavelengths from the glass.

DETAILED DESCRIPTION OF CERTAIN EXAMPLE EMBODIMENTS OF THIS INVENTION

Figure 1:
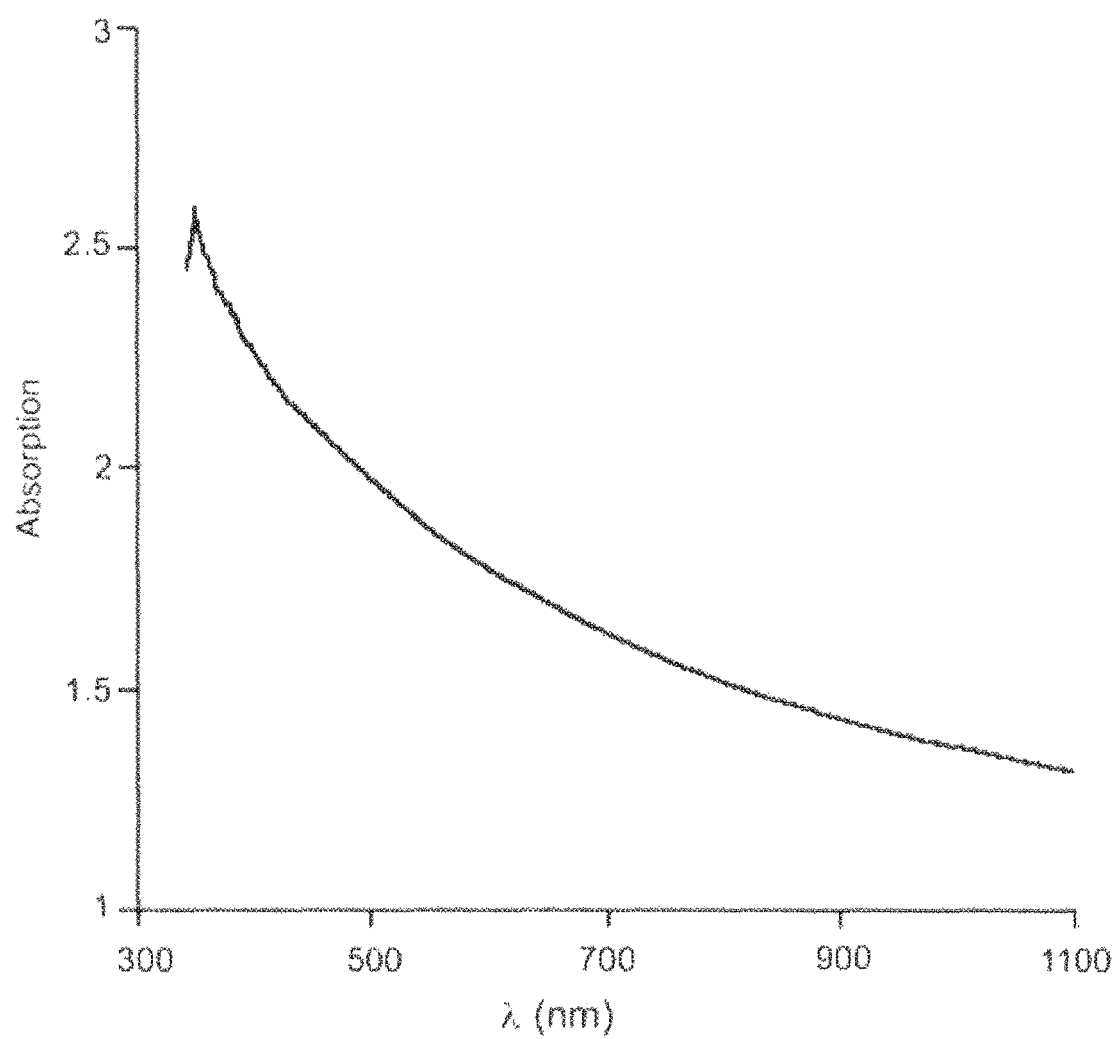
FIG. 1 is a graph illustrating the absorption of nickel sulfide inclusions that may be present in float glass, versus wavelength (nm).

A method and/or system is provided for detecting inclusions (e.g., nickel sulfide based inclusions/defects) in soda-lime-silica based glass 1. In certain example embodiments, the soda-lime-silica based glass 1 comprises a base glass portion that includes, by weight percentage: $SiO_2$ 67-75%, $Na_2O$ 10-20%, CaO 5-15%, $Al_2O_3$ 0-7%, MgO 0-7%, and $K_2O$ 0-7%. Optionally, a colorant portion of the glass may further include one or more colorants such as iron, selenium, cobalt, erbium and/or the like. Alternatively, the glass 1 may be a different type of glass such as borosilicate glass, aluminosilicate glass, or the like.

An example soda-lime-silica base glass 1 according to certain embodiments of this invention that may be made via the float process or other suitable process, on a weight percentage basis, includes the following basic ingredients:

TABLE 1

| Example Base Glass | |
|---|---|
| Ingredient | Wt. % |
| $SiO_2$ | 67-75% |
| $Na_2O$ | 10-20% |
| CaO | 5-15% |
| MgO | 0-7% |
| $Al_2O_3$ | 0-7% |
| $K_2O$ | 0-7% |

Other minor ingredients, including various refining aids, such as salt cake, crystalline water and/or the like may also be included in the base glass. In certain embodiments, for example, glass 1 herein may be made from batch raw materials silica sand, soda ash, dolomite, limestone, with the use of salt cake ($SO_3$) as a refining agent. Reducing and oxidizing agent(s) may also be used in certain instances. In certain instances, soda-lime-silica base glasses 1 herein may include by weight from about 10-15% $Na_2O$ and from about 6-12% CaO. In addition to the base glass materials discussed above, the glass batch and/or final glass 1 may also include a colorant portion including material(s) such as iron, erbium, cobalt, selenium and/or the like in suitable amounts in order to provide coloration and/or absorption to the glass in a desired manner. In certain example embodiments of this invention, the amount of total iron in the glass may be from about 0.05 to 1.2%, more preferably from about 0.3 to 0.8%.

In the case of certain clear high transmission glasses, the total iron may be from about 0.005 to 0.025%. The total amount of iron present in the glass, and thus in the colorant portion thereof, is expressed herein in terms of $Fe_2O_3$ in accordance with standard practice. This, however, does not imply that all iron is actually in the form of $Fe_2O_3$. Likewise, the amount of iron in the ferrous state is reported herein as FeO, even though all ferrous state iron in the glass may not be in the form of FeO.

When making the glass via the float process for example, the glass batch raw materials (e.g., silica sand, soda ash, dolomite, limestone, colorant(s), etc.) are provided in and heated in a furnace or melter to form a glass melt. The glass melt is poured onto a bath of molten material such as tin (tin bath), where the glass is formed and continuously cooled to form a float glass ribbon. The float glass ribbon proceeds toward an annealing lehr for slow cooling. Optionally, prior to entering the annealing lehr, lateral edge portion(s) of the glass sheet may be trimmed in a hot condition. The glass sheet typically reaches the beginning of the annealing lehr at a temperature of at least about 540 degrees C., more preferably at least about 580 degrees, C., with a possible range from about 540 (or 580) to 800 degrees C. During the annealing, the temperature of the glass sheet strip is slowly cooled from the annealing point (e.g., from about 538-560 degrees C.) to a strain point of from about 495-560 degrees C., which may be referred to as an annealing range. While these temperature ranges are preferred for annealing, different temperatures may be used in certain instances. The continuous glass sheet may be supported by either rollers or gas during annealing. After annealing, the continuous glass sheet is moved on for further processing such as one or more of cutting, additional cooling, coating and/or the like.

Figure 2:
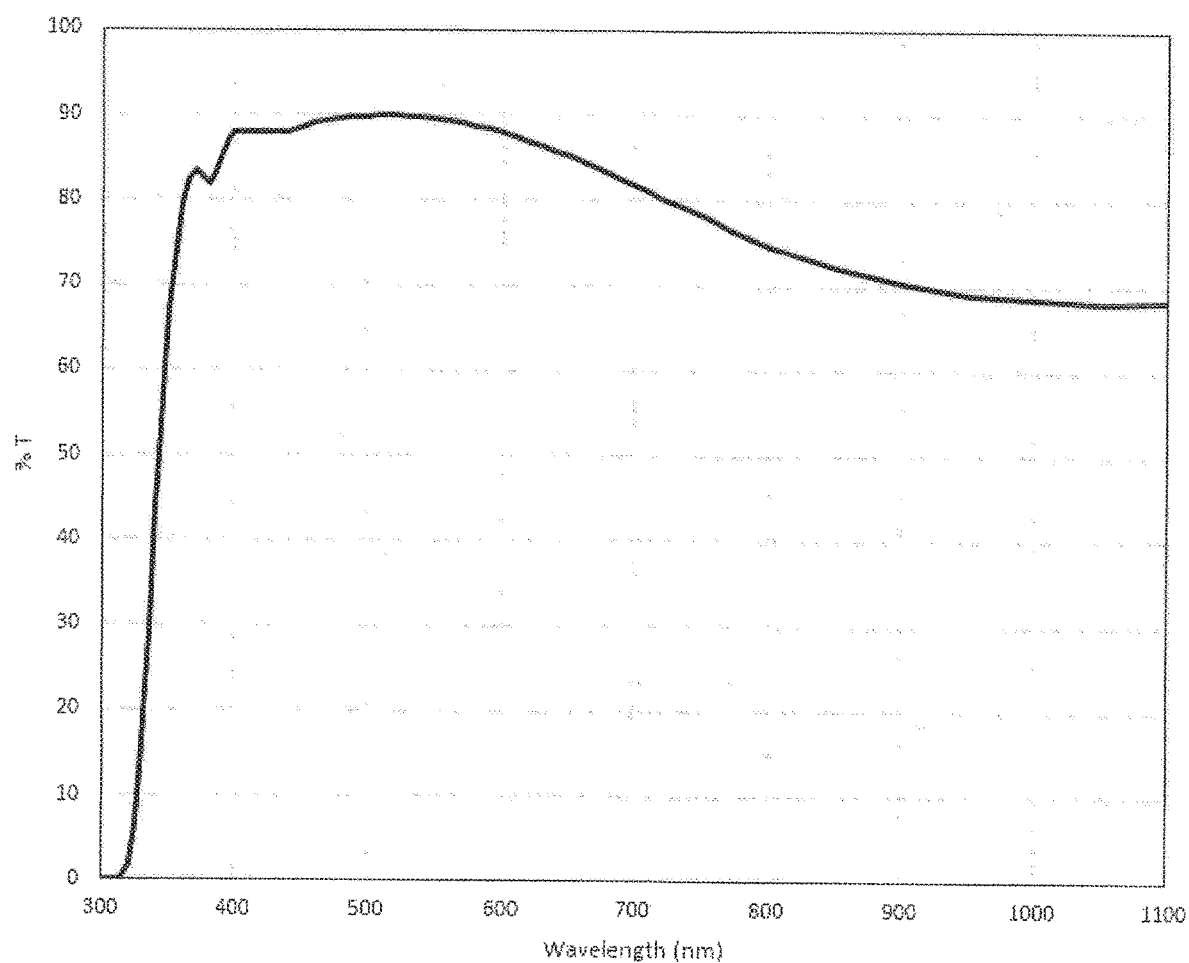
FIG. 2 is a graph illustrating the transmission (% T) of an example soda-lime-silica based float glass, versus wavelength (nm).

As shown in FIGS. 1-2, NiS is generally an opaque material, which makes it absorbent to certain light wavelengths for which glass is transparent. Float glass 1, for instance, is substantially absorbent in ultra-violet (UV) and near-infrared (NIR) regions. At the same time, visible wavelengths (400-700 nm) and even some near IR pass through glass 1 with ease as shown in FIG. 2.

Figure 4:
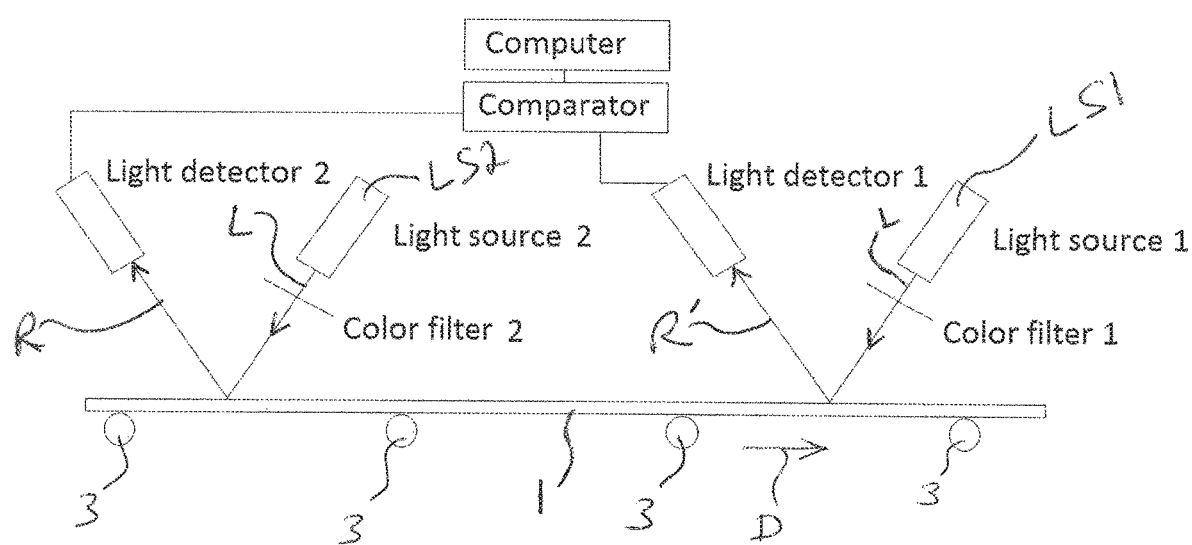
FIG. 4 is a schematic diagram of a system for detecting inclusions in float glass according to an example embodiment of this invention.

FIG. 4 illustrates an example system for detecting inclusions and/or other defects (e.g., micro inclusions such as nickel sulfide based inclusions/defects) in soda-lime-silica based glass 1, such as float glass moving in direction D on rollers 3. In certain example embodiments of this invention, light (e.g., visible light, which includes red, green and blue wavelengths) L from at least one light source LS is directed at the glass 1, and different wavelengths of reflected light (e.g., refracted and/or scattered light) R, R' from the at least one light source are analyzed and compared and inclusions can be detected based on differentiating between the different wavelengths. The light from the source(s) LS1, LS2 may or may not be focused on the glass 1, such as being focused on the upper surface of the glass. For example, nickel sulfide inclusions in the glass 1 have surface roughness features that will affect a given wavelength range (e.g., 400-500 nm) differently than another wavelength range(s) (e.g., 600-650 nm). For example, nickel sulfide inclusions have surface roughness features that will diffract more blue light than red light, thereby providing different degrees of scattering at different wavelengths such as at blue and red wavelengths. Thus, nickel sulfide based inclusions in the glass 1 may be detected based on different wavelengths being affected (e.g., diffracted and/or scattered) differently, whereas float glass itself absent inclusions does not have such an effect. For example, referring to FIG. 4, color filter 1 may filter the visible light from light source LS1 so as to filter out green and blue light, so that light detector 1 receives and analyzed reflected (e.g., refracted and/or scattered) red light, and color filter 2 may filter the visible light from light source LS2 so as to filter out green and red light, so that light detector 2 receives and analyzed reflected (e.g., refracted and/or scattered) blue light. It is noted that the color filters are optional, and in embodiments where one or both of the color filters are not present the processing system may analyze and compare particular wavelengths. A computer and/or computer system, including a processor and a comparator (which may be part of the processor), then analyzes the reflected red and blue light and determines whether nickel sulfide based inclusion(s) is/are present based on at least the difference between the reflected red and blue light from a given glass location.

For example, it may be determined, via the processor of the computer, that a nickel sulfide based inclusion is present in a given area/location of the glass 1 when the difference between (a) the brightness, intensity, degree, size, and/or amount of red light reflected (e.g., refracted and/or scattered) from that area/location, and (b) the brightness, intensity, degree, size, and/or amount of blue light reflected (e.g., refracted and/or scattered) from that area/location, is greater than a predetermined value. When the difference between (a) and (b) is less than the predetermined value, it may be determined that no nickel sulfide based inclusion (e.g., in a given size range such as the size range discussed herein) is present at that location of the glass.

In an example embodiment of this invention, during and/or after the glass-making process, following the stage in the float process where the glass sheet is formed and floated on a molten material (e.g., tin bath) and cooled or allowed to at least partially cool such as after an annealing lehr, light from at least one light source(s) LS1, LS2 is directed at the resulting glass 1 and inclusions may be detected based on analyzing and/or comparing reflected light (e.g., refracted and/or scattered light) as a function of wavelength ($\lambda$). For example, as mentioned above, significant differences in reflected light (e.g., refracted and/or scattered) at a given location may indicate the presence of a nickel sulfide based inclusion(s). The system shown in FIG. 4 for detecting inclusions, such as nickel sulfide (of any stoichiometry) based inclusions, in the glass 1 may be located on the float line after the annealing lehr, and before or after a glass cutting station, in certain example embodiments of this invention. When inclusion(s) are found in the glass, that portion of the glass is discarded and/or not subjected to thermal tempering. Alternatively, the inclusion detecting system shown in FIG. 4 may instead be located separate from the float line, such as at a station between the float line and a tempering furnace, or at a station just prior to a tempering furnace in a tempering facility, in order to detect inclusions and discard glass with inclusions prior to thermal tempering. Such an inclusion detection process may also be utilized during or after manufacture of other types of glass such as borosilicate glass, aluminosilicate glass, or the like (as opposed to during or after a float process for making soda-lime-silica based glass). The light source(s) LS1, LS2 may be pulsed or continuous in different example embodiments, and may be a single source or an array of light sources. Nickel sulfide based inclusions in the glass 1 are thus detected based on wavelength.

Glass made in this manner, after passing the detection station with no inclusions being detected, is useful, for example and without limitation, in glass window applications for buildings and/or vehicles, solar cell applications, furniture glass applications, and/or display glass applications.

Thus, in certain example embodiments of this invention, there is provided a method of detecting nickel sulfide (e.g., NiS) based inclusions. The method is based on a nickel sulfide inclusion, due to its crystalline nature, has surface micro-roughness, and the size of this micro-roughness is at least on the scale of visible light (400-700 nm). Reflecting and then analyzing light of various colors (wavelengths) in this range from inclusions allows for discriminating between nickel sulfide inclusions/defects and other types of inclusions/defects.

Figure 3:
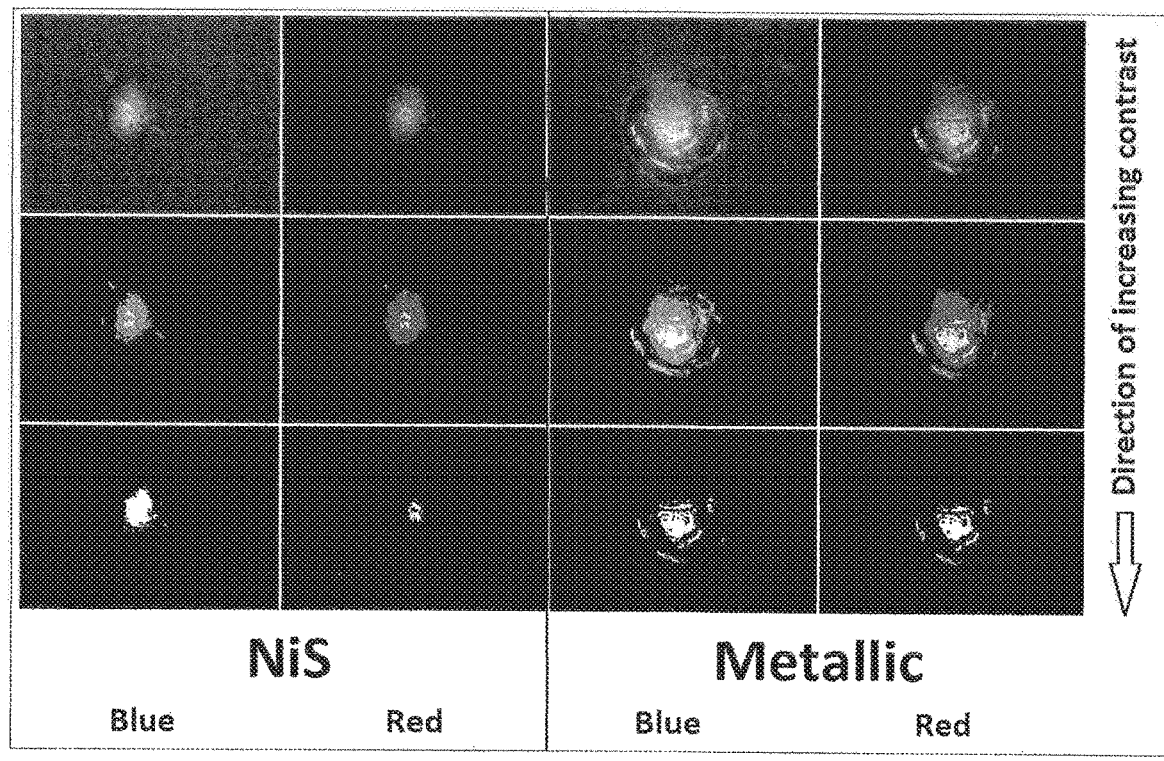
FIG. 3 includes a plurality of pictures of nickel sulfide inclusions (left two columns) and non-NiS metallic inclusions (right two columns) in glass with respect to incident blue light and incident red light at different contrast levels.

In certain example embodiments, light from the same light source(s) is sent toward the glass from essentially the same angle (e.g., light from sources LS1 and LS2 is directed toward the moving glass in FIG. 4 from the same angle), but with at least two different colors, and then a processor is provided for analyzing (e.g., comparing) the images (e.g., see images in FIG. 3). In case of non-NiS inclusions, such as metallic inclusions for example in the two right columns of FIG. 3, the smooth surface of such inclusions will cause no significant difference in the reflected image off and around the inclusion between different colors, as shown in the two right columns of FIG. 3. However, in case of nickel sulfide based inclusions, shown in the left two columns of FIG. 3, surface roughness features of such inclusions in the blue range (e.g., 400-500 nm), for instance, will diffract more blue light compared to red light (e.g., 600-650 nm), thus providing different degrees of scattering detectable by a visual-detection system, as shown in the left two columns of FIG. 3.

FIG. 3 demonstrates an example comparison between a nickel sulfide inclusion (left two columns) and a non-NiS metallic inclusion (right two columns), under blue and red light at different contrast levels. And, as explained above, FIG. 4 illustrates an example system and apparatus to detect the inclusions and identify their nature, such as whether or not nickel sulfide based inclusions are present and/or whether a given inclusion is nickel sulfide based. Row 1 illustrates less contrast in processing, and Row 3 in FIG. 3 illustrates more contrast in processing of the reflected signals, and Row 2 in FIG. 3 illustrates what occurs when a medium amount of contrast is used during processing of the reflected red and blue wavelengths. Row 3, with increased contrast used during processing the red and green reflected wavelengths, demonstrates that very different red and blue reflected images are provided for the nickel sulfide based inclusion in the left two columns (but not for the metallic inclusion in the right two columns). Thus, the detection of a significant different between the blue and red reflections off the inclusion, such as in Row 3 in the left two columns of FIG. 3, evidences the presence of a nickel sulfide based inclusion. Upon detecting the inclusion(s), the defective glass may undergo a pass/reject algorithm, such that it may either be rejected or sent for a detailed identification of inclusions. If no nickel sulfide based inclusions are present, the glass 1 may still be used in production.

Accordingly, in an example embodiment of this invention, there is provided a system and/or method of detecting nickel sulfide based inclusions in annealed or tempered glass. The inclusions are identified based on scattering light of at least two different colors (wavelengths) from the defect. The reflection of light of at least two different colors produces different reflected images of a nickel sulfide based inclusion due to slightly different diffraction of different wavelengths with morphological features of nickel sulfide based inclusions (e.g., see two left columns in third row of FIG. 3). On the other hand, with non-NiS metallic or silicon-based inclusions there are produced reflected patterns less sensitive to the color of the incident light (e.g., see the two right columns in the third row of FIG. 3). Preferably, the two colors of light are in the visible wavelength range. For example, the first color may be blue (e.g., 400-480 nm) and the second color may be red (e.g., 650-700 nm). The two colors of light are in different spectral regions of the visible spectrum. While the two colors are preferably in the visible part of the spectrum, it is possible that one or more may be outside the visible spectrum. It is also possible that green light may replace red or blue. As another example, one of the two wavelengths of light may be in the visible spectrum, while the other is in the near infra-red (e.g., 700-1200 nm). As another possible example, one of the two wavelengths of light may be in the visible spectrum, while the other is in the UV portion of the spectrum, but at a wavelength longer than the absorption edge of glass (the absorption edge varies depending on the type of glass and can range from 200 to 380 nm). In another example embodiment, one of the two wavelengths of light may be in the near-IR, while the other is in the UV part of the spectrum. Thus, light of two or more wavelengths is used for the detection of inclusions such as NiS inclusions. The inclusion detection system may be inline or offline.

In an example embodiment of this invention, there is provided a system for detecting an inclusion in glass, the glass including a base glass composition comprising: $SiO_2$ 67-75%, $Na_2O$ 10-20%, CaO 5-15%, $Al_2O_3$ 0-7%, $K_2O$ 0-7%, the system comprising: at least one light source for directing light toward the glass; and a processor configured to determine whether an inclusion comprising nickel sulfide is present in the glass based at least on a difference between first and second reflected wavelengths.

In the system of the immediately preceding paragraph, the first wavelength may be a red wavelength and/or the second wavelength may be a blue wavelength.

In the system of any of the preceding two paragraphs, the first wavelength may comprise wavelengths in a range from about 650-700 nm.

In the system of any of the preceding three paragraphs, the second wavelength may comprise wavelengths in a range from about 400-480 nm.

In the system of any of the preceding four paragraphs, the reflected wavelengths may be wavelengths refracted and/or scattered by the inclusion in the glass.

In the system of any of the preceding five paragraphs, the at least one light source may comprise a first light source and a second light source, which may be oriented at substantially the same angle relative to the glass. A first color filter may be provided between the glass and the first light source, and a second color filter may be provided between the glass and the second light source.

In the system of any of the preceding six paragraphs, the processor may be configured for determining whether an inclusion comprising nickel sulfide is present in the glass based at least on a difference between first and second reflected wavelengths at least by analyzing at least one image comprising reflections from the inclusion.

In the system of any of the preceding seven paragraphs, the processor may be configured to determine whether to pass or reject the glass based at least on whether an inclusion comprising nickel sulfide is detected.

In the system of any of the preceding eight paragraphs, the light source may be located on and/or in a float line, and may be positioned after an annealing lehr of the float line.

In the system of any of the preceding nine paragraphs, the processor may be configured to determine that the inclusion comprising nickel sulfide is present in the glass when a difference between (a) one or more of a brightness, intensity, degree, size, and/or amount of red light reflected from the inclusion, and (b) one or more of a brightness, intensity, degree, size, and/or amount of blue light reflected from the inclusion, is greater than a predetermined value.

Once given the above disclosure many other features, modifications and improvements will become apparent to the skilled artisan. Such features, modifications and improvements are therefore considered to be a part of this invention, the scope of which is to be determined by the following claims:

What is claimed is:

1. A method of detecting an inclusion in glass, the glass including a base glass composition comprising:

| Ingredient | wt. % |
|---|---|
| $SiO_2$ | 67-75% |
| $Na_2O$ | 10-20% |
| CaO | 5-15% |
| $Al_2O_3$ | 0-7% |
| $K_2O$ | 0-7% | the method comprising:
 directing light from at least one light source toward the glass; and
 determining whether an inclusion comprising nickel sulfide is present in the glass based at least on a difference between how first and second reflected wavelengths are diffracted and/or scattered.

2. The method of claim 1, wherein the first wavelength is a red wavelength.

3. The method of claim 1, wherein the second wavelength is a blue wavelength.

4. The method of claim 1, wherein the first wavelength comprises wavelengths in a range from about 650-700 nm.

5. The method of claim 1, wherein the second wavelength comprises wavelengths in a range from about 400-480 nm.

6. The method of claim 1, wherein the reflected wavelengths are wavelengths refracted and/or scattered by the inclusion in the glass.

7. The method of claim 1, wherein said at least one light source comprises a first light source and a second light source.

8. The method of claim 7, wherein a first color filter is provided between the glass and the first light source, and a second color filter is provided between the glass and the second light source.

9. The method of claim 1, wherein said determining whether an inclusion comprising nickel sulfide is present in the glass based at least on a difference between first and second reflected wavelengths comprises analyzing at least one image comprising reflections from the inclusion.

10. The method of claim 1, further comprising determining whether to pass or reject the glass based at least on whether an inclusion is detected.

11. The method of claim 1, wherein the light source is located on and/or in a float line, and is positioned after an annealing lehr of the float line.

12. The method of claim 1, wherein said determining whether an inclusion comprising nickel sulfide is present in the glass based at least on a difference between first and second reflected wavelengths comprises determining that the inclusion comprising nickel sulfide is present in the glass when a difference between (a) one or more of a brightness, intensity, degree, size, and/or amount of red light reflected from the inclusion, and (b) one or more of a brightness, intensity, degree, size, and/or amount of blue light reflected from the inclusion, is greater than a predetermined value.

13. A system for detecting an inclusion in glass, the glass including a base glass composition comprising:

| Ingredient | wt. % |
|---|---|
| $SiO_2$ | 67-75% |
| $Na_2O$ | 10-20% |
| CaO | 5-15% |
| $Al_2O_3$ | 0-7% |
| $K_2O$ | 0-7% | the system comprising:
 at least one light source for directing light toward the glass; and
 a processor configured to determine whether an inclusion comprising nickel sulfide is present in the glass based at least on a difference between how first and second reflected wavelengths are diffracted and/or scattered.

14. The system of claim 13, wherein the first wavelength is a red wavelength.

15. The system of claim 13, wherein the second wavelength is a blue wavelength.

16. The system of claim 13, wherein the first wavelength comprises wavelengths in a range from about 650-700 nm.

17. The system of claim 13, wherein the second wavelength comprises wavelengths in a range from about 400-480 nm.

18. The system of claim 13, wherein the reflected wavelengths are wavelengths refracted and/or scattered by the inclusion in the glass.

19. The system of claim 13, wherein said at least one light source comprises a first light source and a second light source oriented at substantially the same angle relative to the glass.

20. The system of claim 13, wherein said at least one light source comprises a first light source and a second light, and wherein a first color filter is provided between the glass and the first light source, and a second color filter is provided between the glass and the second light source.

21. The system of claim 13, wherein said processor is configured for determining whether an inclusion comprising nickel sulfide is present in the glass based at least on a difference between first and second reflected wavelengths at least by analyzing at least one image comprising reflections from the inclusion.

22. The system of claim 13, wherein the processor is configured to determine whether to pass or reject the glass based at least on whether an inclusion comprising nickel sulfide is detected.

23. The system of claim 13, wherein the light source is located on and/or in a float line, and is positioned after an annealing lehr of the float line.

24. The system of claim 13, wherein the processor is configured to determine that the inclusion comprising nickel sulfide is present in the glass when a difference between (a) one or more of a brightness, intensity, degree, size, and/or amount of red light reflected from the inclusion, and (b) one or more of a brightness, intensity, degree, size, and/or amount of blue light reflected from the inclusion, is greater than a predetermined value.

25. A method of detecting an inclusion in glass, the glass including a base glass composition comprising:

| Ingredient | wt. % |
| --- | --- |
| $SiO_2$ | 67-75% |
| $Na_2O$ | 10-20% |
| CaO | 5-15% |
| $Al_2O_3$ | 0-7% |
| $K_2O$ | 0-7% | the method comprising:
  directing light, comprising first and second wavelengths, from at least one light source toward the glass; and
  determining whether an inclusion is present in the glass based at least on a difference between how the first and second wavelengths are diffracted and/or scattered by the glass.

26. The method of claim 25, wherein the first wavelength is a red wavelength.

27. The method of claim 25, wherein the second wavelength is a blue wavelength.

28. The method of claim 25, wherein the first wavelength comprises wavelengths in a range from about 650-700 nm.

29. The method of claim 25, wherein the second wavelength comprises wavelengths in a range from about 400-480 nm.

30. The method of claim 25, wherein the inclusion comprises nickel sulfide.

\* \* \* \* \*